United States Patent [19]

Doi et al.

[11] Patent Number: 4,619,969
[45] Date of Patent: Oct. 28, 1986

[54] POLYOLEFIN COMPOSITION COMPRISING PROPYLENE POLYMER AND ETHYLENE/ANHYDRIDE/ESTER COPOLYMER

[75] Inventors: Toshiki Doi, Osaka; Hideo Shinonaga; Tadayuki Omae, both of Chiba, all of Japan

[73] Assignee: Sumitomo Chemical Company, Limited, Osaka, Japan

[21] Appl. No.: 795,146

[22] Filed: Nov. 5, 1985

[30] Foreign Application Priority Data

Nov. 5, 1984 [JP] Japan ................................ 59-232992

[51] Int. Cl.[4] ...................... C08L 23/12; C08L 23/16; C08L 23/08; C08L 33/06
[52] U.S. Cl. ...................................... 525/93; 525/207; 525/194; 525/225; 525/227; 525/221
[58] Field of Search .................. 525/207, 194, 93, 221

[56] References Cited

U.S. PATENT DOCUMENTS

| | | | |
|---|---|---|---|
| 3,410,928 | 11/1968 | Baum .................................... | 525/221 |
| 3,497,574 | 2/1970 | Press .................................... | 525/221 |
| 3,966,672 | 6/1976 | Gaylord .............................. | 260/42.14 |
| 4,042,648 | 8/1977 | Kitamura et al. .................... | 525/221 |
| 4,284,542 | 8/1981 | Boyce et al. ........................ | 525/206 |

*Primary Examiner*—Carman J. Seccuro
*Attorney, Agent, or Firm*—Sughrue, Mion, Zinn, Macpeak & Seas

[57] ABSTRACT

A polypropylene-based resin composition comprising (A) from 60 to 99 parts by weight of a polypropylene-based resin and (B) from 1 to 40 parts by weight of an ethylene copolymer composed of from 25 to 98.5% by weight of ethylene, from 0.5 to 15% by weight of an unsaturated dicarboxylic acid anhydride and from 1 to 60% by weight of an unsaturated ester compound having from 4 to 12 carbon atoms and/or a modified copolymer obtained by ring opening addition reaction of the acid anhydride group of said ethylene copolymer with an alcohol having from 1 to 20 carbon atoms. The composition provides a molded particle having excellent finishing workability and improved mechanical properties.

5 Claims, No Drawings

POLYOLEFIN COMPOSITION COMPRISING PROPYLENE POLYMER AND ETHYLENE/ANHYDRIDE/ESTER COPOLYMER

FIELD OF THE INVENTION

This invention relates to a polyolefin composition which can provide a molded article having improved workability in finishing, such as coating, printing, adhesion, hot-stamping, deposition, and the like. More particularly, this invention relates to a polypropylene-based resin composition which can provide a molded article having not only improved workability in finishing but also improved mechanical properties, such as impact resistance.

BACKGROUND OF THE INVENTION

Polypropylene has satisfactory molding processability, and molded articles obtained therefrom are excellent in mechanical properties, such as rigidity, tensile strength, flexural strength, etc., water-resistance, chemical resistance, and the like. Besides, polypropylene has a low specific gravity and is inexpensive. Hence, it has been industrially produced in large quantities for wide applications as various injection-molded articles, hollow molded articles, and extrusion-molded articles, e.g., films, sheets, tubes, fibers, tapes, etc. However, polypropylene having such advantages involves difficulty in finishing, such as coating, printing, adhesion, hot-stamping, deposition, etc., due to its non-polarity, and many attempts for overcoming this disadvantage have hitherto been made. For example, studies have been conducted on modification of a surface layer of a polypropylene molded article by physical or chemical processes prior to finishing and put into practical application. These improved processes, however, produce insufficient effects because they require complicated steps or, depending upon etching processes, accompany deformation of molded articles. Therefore, no satisfactory results can be obtained in view of increased cost.

Further, there have been proposed an improved process in which polypropylene is graft-modified with an unsaturated carboxylic acid or an anhydride thereof, e.g., acrylic acid, maleic anhydride, etc., in the presence of an initiator, such as an organic peroxide as disclosed in Japanese Patent Application (OPI) No. 76149/75 (the term "OPI" as used herein refers to a "published unexamined Japanese patent application") or Japanese Patent Publication No. 10265/76, and a process in which the above-described graft-modified polymer is blended with unmodified polypropylene. In these processes, however, degradation of polypropylene is induced by the peroxide so that the amount of the unsaturated carboxylic acid or anhydride thereof to be introduced by graft-modification is restricted. As a result, the effect on surface modification is insufficient, or if any effect may be produced, degradation is accompanied by deterioration of mechanical properties.

In order to eliminate the above-described problems, the present inventors have conducted extensive and intensive investigations. As a result, it has now been found that a large amount of a polar group can be introduced to polypropylene not only to remarkably improve finishing workability of the molded article obtained therefrom but also to improve mechanical properties of the molded article, such as impact resistance, by mixing polypropylene with an ethylene copolymer comprising an unsaturated dicarboxylic acid anhydride and an unsaturated ester as comonomers and/or a modified copolymer prepared by ring opening addition reaction of an alcohol to the anhydride group of said ethylene copolymer. The present invention has been completed based on this finding.

SUMMARY OF THE INVENTION

That is, the present invention relates to a polypropylene-based resin composition comprising:

(A) from 99 to 60 parts by weight of a polypropylene-based resin, and (B) from 1 to 40 parts by weight of an ethylene copolymer comprising from 25 to 98.5% by weight of ethylene, from 0.5 to 15% by weight of an unsaturated dicarboxylic acid anhydride and from 1 to 60% by weight of an unsaturated ester compound having from 4 to 12 carbon atoms and/or a modified copolymer obtained by ring opening addition reaction of the anhydride group of said copolymer with an alcohol having from 1 to 20 carbon atoms.

DETAILED DESCRIPTION OF THE INVENTION

The polypropylene-based resin which can be used in the present invention includes crystalline polypropylene, a crystalline propylene-ethylene block or random copolymer, a crystalline propylene-α-olefin copolymer which the α-olefin has 4 to 10 carbon atoms, and the like, either alone or in combination of two or more thereof. These polypropylene-based resins usually have a melt index ranging from 0.5 to 100, and preferably from 1 to 50, in accordance with JIS K6758.

The unsaturated dicarboxylic acid anhydride that is a comonomer of the ethylene copolymer constituting the polypropylene-based resin composition of this invention specifically includes maleic anhydride, citraconic anhydride, itaconic anhydride, tetrahydrophthalic anhydride, endo-bicyclo(2,2,1)-5-heptene-2,3-dicarboxylic acid anhydride, cis-4-cyclohexene-1,2-dicarboxylic acid anhydride, etc., with maleic anhydride being the most preferred. These unsaturated dicarboxylic acid anhydrides are present in the ethylene copolymer in an amount of from 0.5 to 15% by weight, and preferably from 1 to 10% by weight. If the content of the unsaturated dicarboxylic acid anhydride is less than 0.5% by weight, the amount of a polar group contributory to finishing workability is too small to produce expected improving effects. Too large a content exceeding the above-recited upper limit brings excessive polarity, resulting in deteriorated compatibility with polypropylene-based resins.

The unsaturated ester compound having from 4 to 12 carbon atoms that is another comonomer of the ethylene copolymer is selected from various unsaturated carboxylic acid ester compounds, such as vinyl ester compounds, e.g., vinyl acetate, vinyl propionate, vinyl ester of versatic acid, etc.; methyl methacrylate, ethyl methacrylate, methyl acrylate, ethyl acrylate, 2-ethylhexyl methacrylate, cyclohexyl methacrylate, hydroxyethyl acrylate, hydroxypropyl methacrylate, fumaric acid monoethyl ester, etc. and combinations thereof. These unsaturated ester compounds are present in the ethylene copolymer in amounts of from 1 to 60% by weight, and preferably from 5 to 50% by weight. Amounts outside the above range are unfavorable because the compatibility with polyolefins is deteriorated or improving effects on mechanical properties, such as impact resistance, are weakened.

The ethylene copolymer can be prepared by any of known techniques, such as solution polymerization, emulsion polymerization, high-pressure bulk polymerization, and the like. Of these, a high-pressure polymerization process, in which ethylene is copolymerized in the presence of a radical generator under a pressure of from 500 to 3,000 atm. and at a temperature of from 100° to 300° C. in the presence or absence of an appropriate solvent or an appropriate chain transfer agent, is most commonly employed. In such a high-pressure polymerization process, it is preferable that a solution having the abovedescribed unsaturated ester compound is directly introduced to a reaction vessel under pressure by means of a pressure pump. The ethylene copolymer thus obtained has a melt index (JIS K6760) ranging from 0.5 to 300, and preferably from 1 to 200. Those having a melt index smaller than the lower limit lack compatibility with polypropylene-based resins, and those having a melt index exceeding the upper limit unfavorably cause reduction of characteristics of polyolefins, such as rigidity, heat resistance and surface hardness.

In the present invention, the ethylene copolymer as above described may be blended as such with the aforesaid polypropylene-based resin, but it is possible to use a modified copolymer obtained by subjecting a part or the whole of the acid anhydride group of the ethylene copolymer to ring opening addition reaction with an alcohol. The alcohol which can be used suitably includes those having from 1 to 20 carbon atoms. Specific examples of the alcohol can be selected from monohydric alcohols, e.g., methanol, ethanol, propyl alcohol, hexyl alcohol, octyl alcohol, lauryl alcohol, oleyl alcohol, stearyl alcohol, cyclohexyl alcohol, etc.; polyhydric alcohols, e.g., ethylene glycol, propylene glycol, glycerin, trimethylolpropane, 1,6-hexanediol, pentaerythritol, dipentaerythritol, etc.; and combinations thereof.

The mode of reaction between the above alcohol and the acid anhydride group-containing ethylene copolymer is not particularly restricted. For example, the reaction may conveniently be carried out by a process wherein the reactants are heated with stirring in a reactor using an aromatic solvent, e.g., xylene, ethylbenzene, tetralin, etc., or a process wherein the reactants are merely melt-kneaded in a vented extruder for plastics. In addition to the method of blending the polypropylene-based resin with the thus prepared alcohol-modified copolymer to obtain the desired polypropylene composition, the polypropylene composition may also be prepared by a process in which the acid anhydride group-containing ethylene copolymer is first blended with the polypropylene-based resin and then the resulting composition is melt-kneaded with the alcohol, or a process in which the acid anhydride group-containing ethylene copolymer, polypropylene-based resin and alcohol are all together melt-kneaded. In any of these processes, the progress of the reaction can be confirmed by reduction or disappearance of an absorption band characteristic of the acid anhydride group at 1780 cm$^{-1}$ in infrared absorption spectrum.

As mentioned before, the polypropylene composition according to the present invention comprises (A) from 60 to 99 parts by weight, and preferably from 70 to 95 parts by weight, of a polypropylene-based resin, and (B) from 1 to 40 parts by weight, and preferably from 5 to 30 parts by weight, of an ethylene copolymer comprising an unsaturated dicarboxylic acid anhydride and an unsaturated ester compound and/or a modified copolymer obtained by ring opening addition reaction of the above-described ethylene copolymer with an alcohol. In this composition, if the content of the component (B) is less than 1 part by weight, the effects to improve finishing workability, impact resistance and the like are insufficient. If it is more than 40 parts by weight, rigidity, heat resistance, surface hardness, etc. that are characteristics of polypropylene-based resins are deteriorated.

If desired, the composition according to the present invention may further contain other various polymers, such as styrene-based elastomers, e.g., a styrene butadiene randodm copolymer, a styrene-butadiene block copolymer and hydrogenated products thereof; polyolefin-based elastomers, e.g., a non-crystalline ethylenepropylene copolymer, an ethylene-propylenedicyclopentadiene copolymer, etc.; and functional group containing polyolefins, e.g., maleic anhydride-graft-modified polypropylene, a glycidyl group-containing ethylene copolymer, etc.

The composition of the present invention may further contain appropriate amounts of a wide variety of additives, such as organic or inorganic fillers, e.g., glass fiber, carbon fiber, metal fiber, talc, calcium carbonate, mica, aluminum flakes, woodmeal, etc.; antioxidants, weathering agents, antistatic agents, foaming agents, coloring agents, and the like.

In the production of the polypropylene-based resin composition of this invention, the method of blending is not particularly restricted, and any of conventional mixing apparatus for plastics or rubber, such as a Banbury mixer, a uniaxial or biaxial screw extruder, a roll mill, etc., can be employed.

Molded articles obtained from the polypropylene-based resin composition according to the present invention, for example, sheets obtained by extrusion molding and injection-molded articles, can easily be finished by coating, printing, hot-stamping, adhesion, deposition, and the like, and show satisfactory mechanical properties, such as impact strength. Therefore, they are expected to be used in broad applications as automobile parts, e.g., bumpers, instrument panels, etc., electric and electronic appliance parts, and the like.

The present invention will now be illustrated in greater detail with reference to the following examples and comparative examples. Unsaturated dicarboxylic acid anhydride group-containing ethylene copolymers, alcoholmodified ethylene copolymers and test plate samples used in these examples and comparative examples were prepared as follows:

UNSATURATED DICARBOXYLIC ACID ANHYDRIDE GROUP-CONTAINING ETHYLENE COPOLYMER

A solution of ethylene containing a small amount of propane as a chain transfer agent and maleic anhydride or Himic Anhydride ® (a trademark manufactured by Hitachi Chemical Co., Ltd.) in the unsaturated ester compound as indicated in Table 1 was continuously supplied under pressure in a 1.2 liter-volume reactor equipped with a stirrer to effect copolymerization at a rate of 1.5 to 3.2 Kg/hr under a pressure of 1,600 Kg/cm$^2$ while maintaining the polymerization temperature at 180° C.

TABLE 1

| | Ethylene Copolymer | | |
|---|---|---|---|
| Sample No. | Unsaturated Dicarboxylic Acid Anhydride | Unsaturated Ester Compound | Melt Index (g/10 min, 190° C.) |
| A | maleic anhydride (1.4) | methyl methacrylate (8.1) | 7 |
| B | maleic anhydride (3.5) | butyl acrylate (20) | 150 |
| C | maleic anhydride (7.1) | methyl acrylate (28.5) | 13 |
| D | maleic anhydride (3.2) | 2-ethylhexyl methacrylate (16.6) | 5 |
| E | maleic anhydride (6.2) | ethyl acrylate (21.5) | 41 |
| F | maleic anhydride (4.8) | methyl methacrylate (36.3) | 24 |
| G | maleic anhydride (2.9) | vinyl acetate (31.4) | 13 |
| H | Himic Anhydride ® (1.7) | ethyl acrylate (18.2) | 8 |

ALCOHOL-MODIFIED ETHYLENE COPOLYMER

Each of the above prepared Samples E and F (ethylene copolymer) and the alcohol indicated in Table 2 were melt-kneaded by heating to 150° to 190° C. in an extruder with a uniaxial screw having a diameter of 30 mm to obtain pellets. The rate of ring opening addition reaction of the maleic anhydride group was determined from a rate of reduction of an infrared absorption band at 1780 cm$^{-1}$.

TABLE 2

| | Alcohol-Modified Ethylene Copolymer | | | |
|---|---|---|---|---|
| Sample No. | Ethylene Copolymer used | Alcohol for Modification | Amount of Alcohol (mol/MAH*) | Estimated Rate of Reaction (%) | Melt Index (g/10 min, 190° C.) |
| a | E | trimethylolpropane | 1.0 | 80 | 5 |
| b | E | pentaerythritol | 1.5 | 90 | 3 |
| c | E | 1,4-butanediol | 0.8 | 65 | 18 |
| d | E | dipentaerythritol | 1.0 | 85 | 5 |
| e | E | ethyl alcohol | 1.0 | 70 | 17 |
| f | F | trimethylolpropane | 1.2 | 80 | 8 |
| g | F | 1,6-hexanediol | 1.5 | 80 | 9 |
| h | F | stearyl alcohol | 1.5 | 75 | 13 |

Note: MAH*: Maleic anhydride group.

TEST PLATE SAMPLE

A polypropylene-based resin composition was molded by a 3-ounce injection molding machine at a resin temperature of 230° C. to produce plates having a size of 150(L)×90(W)×2(T) mm.

Test methods for evaluating various properties of molded articles obtained in the examples and comparative examples are as follows.

INITIAL ADHESIVENESS OF COATING FILM

A plate sample was washed in 1,1,1-trichloroethane vapors (74° C.) for 30 seconds. After drying at room temperature, a urethane coating (Flexthan ® #101, a trademark manufactured by Nippon Bee Chemical Co., Ltd.) was directly spray-coated on the plate, followed by baking at 120° C. for 30 minutes in an oven.

The urethane coating film was crosshatched in 2 mm-squares (100 squares; 10 squares in line × 10 squares in rank) with a blade, and a 24 mm wide adhesive tape (Cellotape ®, a trademark manufactured by Nichiban Co., Ltd.) was sticked thereon with fingers. One end of the adhesive tape was rapidly peeled off, and the percent of the squares remaining on the plate was determined to evaluate initial adhesiveness of the coating film.

WATER RESISTANCE OF COATING FILM

The same coated test plate with its coating film being crosshatched as prepared above was immersed in warm water at 40° C. and then subjected to the same peeling test as described above.

PEEL STRENGTH OF COATING FILM

A coating film of the same coated test plate as prepared above was cut in parallel with a width of 5 mm. One end of the coating film strip was peeled off at a peel angle of 180° at a rate of pulling of 50 mm/min to determine a peel strength (g/cm).

ADHESIVENESS

A polypropylene-based resin composition was extruded from a T-die extruder having a screw diameter of 30 mm to prepare a sheet sample having a width of 20 cm and a thickness of 195 μm. A hard polyvinyl chloride sheet having a thickness of 300 μm (manufactured by Tsutsunaka Plastic Industry Co., Ltd.) was superposed on the sheet sample and hot-pressed at 180° C. under a pressure of 20 Kg/cm² for 10 minutes. A test piece of 25 mm in width was cut from the resulting laminated sheet, and the end of the polyvinyl chloride sheet was peeled off at a peel angle of 180° and at a rate of pulling of 50 mm/min to determine an adhesive strength (g/cm).

IMPACT RESISTANCE

A polypropylene-based resin composition was molded by a 3-ounce injection molding machine at a resin temperature of 230° C. to prepare a test piece having a size of 127(L)×12.7(W)×6.4(T) mm. An Izod impact strength (notched) of the test piece was measured in accordance with ASTM D256.

EXAMPLES 1 to 21

A mixture comprising a polypropylene-based resin shown in Table 3 and the ethylene copolymer shown in Table 1 or the alcohol-modified ethylene copolymer shown in Table 2 at a mixing ratio indicated in Table 3 was extruded using a screw extruder having a screw diameter of 30 mm under conditions of a resin temperature of 220° C. (at the die opening), an average retention time of 4.5 minutes and an extrusion rate of 2.2 Kg/hr to obtain pellets.

The pellets were molded into a plate by the method as described above, and the test plate was spraycoated with a urethane coating by the above-described method. The thus obtained coated resin plate was tested for various properties as described above, and the results obtained are shown in Table 4.

COMPARATIVE EXAMPLES 1 TO 4

The same procedures as described in Examples 1 to 21 were repeated except that the ethylene copolymer of Table 1 or the alcohol-modified ethylene copolymer of Table 2 was not used. The results obtained are shown in Table 4 below.

While the invention has been described in detail and with reference to specific embodiments thereof, it will be apparent to one skilled in the art that various changes and modifications can be made therein without departing from the spirit and scope thereof.

What is claimed is:

TABLE 3

| Example No. | Polypropylene-Based Resin Composition ||||| Alcohol-Modified Copolymer || Other Additives ||
| | Polypropylene-Based Resin ||| Ethylene Copolymer || | | | |
| | Type | Comonomer (content: wt %) | Melt Index (g/10 min, 230° C.) | Mixing Ratio (by wt.) | Sample No. | Mixing Ratio (by wt.) | Sample No. | Mixing Ratio (by wt.) | Kind | Mixing Ratio (by wt.) |
|---|---|---|---|---|---|---|---|---|---|---|
| Comparative Example 1 | block | ethylene (8) | 8 | 100 | — | — | — | — | — | — |
| Example 1 | " | " | " | 80 | A | 20 | — | — | — | — |
| Example 2 | " | " | " | " | B | " | — | — | — | — |
| Example 3 | " | " | " | 65 | C | 15 | — | — | GF* | 20 |
| Comparative Example 2 | " | " | " | 80 | — | — | — | — | " | " |
| Example 4 | " | " | " | 80 | — | — | a | 20 | — | — |
| Example 5 | " | " | " | " | — | — | b | " | — | — |
| Example 6 | " | " | " | " | — | — | c | " | — | — |
| Example 7 | " | " | " | " | — | — | d | " | — | — |
| Example 8 | " | " | " | " | — | — | e | " | — | — |
| Example 9 | " | " | " | " | — | — | f | " | — | — |
| Example 10 | " | " | " | " | — | — | g | " | — | — |
| Example 11 | " | " | " | " | — | — | h | " | — | — |
| Example 12 | " | " | " | 65 | — | — | a | 15 | GF* | 20 |
| Comparative Example 3 | " | " | " | 80 | — | — | — | — | " | " |
| Comparative Example 4 | homo | — | 10 | 100 | — | — | — | — | — | — |
| Example 13 | " | — | " | 85 | A | 15 | — | — | — | — |
| Example 14 | " | — | " | " | B | " | — | — | — | — |
| Example 15 | " | — | " | " | D | " | — | — | — | — |
| Example 16 | " | — | " | 90 | E | 10 | — | — | — | — |
| Example 17 | " | — | " | 85 | F | 15 | — | — | — | — |
| Example 18 | " | — | " | 80 | G | 20 | — | — | — | — |
| Example 19 | " | — | " | " | H | 20 | — | — | — | — |
| Example 20 | " | — | " | " | E | 10 | a | 10 | — | — |
| Example 21 | " | — | " | " | F | 10 | f | 10 | — | — |

Note: GF*: glass fiber

TABLE 4

| Example No. | Coating Performance || Peel Strength (g/cm) | Adhesive Strength (g/cm) | Impact Strength (Kg · cm/cm) |
| | Initial Adhesiveness (%) | Water Resistance (%) | | | |
|---|---|---|---|---|---|
| Comparative Example 1 | 0 | 0 | 80 | 0 | 6.4 |
| Example 1 | 95 | 90 | 250 | 360 | 12.6 |
| Example 2 | 100 | 100 | 820 | 1150 | 14.2 |
| Example 3 | 100 | 100 | 950 | 1030 | 16.5 |
| Comparative Example 2 | 10 | 0 | 100 | 0 | 7.4 |
| Example 4 | 100 | 100 | 1020 | 1350 | 15.5 |
| Example 5 | 100 | 100 | 960 | 980 | 14.6 |
| Example 6 | 100 | 100 | 920 | 1010 | 13.5 |
| Example 7 | 100 | 100 | 860 | 870 | 13.8 |
| Example 8 | 100 | 100 | 950 | 860 | 13.2 |
| Example 9 | 100 | 100 | 880 | 1200 | 15.4 |
| Example 10 | 100 | 100 | 870 | 800 | 14.3 |
| Example 11 | 100 | 100 | 840 | 630 | 13.6 |
| Example 12 | 100 | 100 | 980 | 560 | 14.6 |
| Comparative Example 3 | 10 | 0 | 100 | 0 | 7.4 |
| Comparative Example 4 | 0 | 0 | 70 | 0 | 2.0 |
| Example 13 | 90 | 85 | 200 | 270 | 2.9 |
| Example 14 | 100 | 100 | 360 | 310 | 3.2 |
| Example 15 | 100 | 100 | 350 | 280 | 3.1 |
| Example 16 | 100 | 100 | 420 | 200 | 2.5 |
| Example 17 | 100 | 100 | 400 | 300 | 3.4 |
| Example 18 | 100 | 100 | 380 | 340 | 4.2 |
| Example 19 | 90 | 85 | 220 | 250 | 3.1 |
| Example 20 | 100 | 100 | 480 | 420 | 3.9 |
| Example 21 | 100 | 100 | 470 | 400 | 4.2 |

1. A polypropylene-based resin composition comprising (A) from 60 to 99 parts by weight of a polypropylene-based resin selected from the group consisting of crystalline polypropylene and crystalline propylene-α-olefin block or random copolymers and (B) from 1 to 40 parts by weight of an ethylene copolymer composed of from 25 to 98.5% by weight of ethylene, from 0.5 to 15% by weight of an unsaturated dicarboxylic acid anhydride and from 1 to 60% by weight of an unsaturated ester compound having from 4 to 12 carbon atoms and/or a modified copolymer obtained by ring opening addition reaction of the acid anhydride group of said ethylene copolymer with an alcohol having from 1 to 20 carbon atoms.

2. A polypropylene-based resin composition as in claim 1, wherein said polypropylene-based resin is present in an amount of from 70 to 95 parts by weight and said ethylene copolymer and/or said modified copolymer is present in an amount of from 5 to 30 parts by weight.

3. A polypropylene-based resin composition as in claim 1, wherein said ethylene copolymer is composed of from 40 to 94% by weight of ethylene, from 1 to 10% by weight of the unsaturated dicarboxylic acid anhydride and from 5 to 50% by weight of the unsaturated ester compound.

4. A polypropylene-based resin composition as in claim 1, wherein said unsaturated dicarboxylic acid anhydride is maleic anhydride.

5. A polypropylene-based resin composition as in claim 1, wherein said alcohol is at least one member selected from the group consisting of trimethylolpropane, 1,4-butanediol, pentaerythritol, 1,6-hexanediol and dipentaerythritol.

* * * * *